United States Patent
Rinaldi et al.

(10) Patent No.: US 8,148,478 B2
(45) Date of Patent: Apr. 3, 2012

(54) PROCESS FOR THE GAS-PHASE POLYMERIZATION OF OLEFINS

(75) Inventors: Riccardo Rinaldi, Mantova (IT); Antonio Mazzucco, Ferrara (IT); Enrico Balestra, Ferrara (IT); Giuseppe Penzo, Mantova (IT); Maurizio Dorini, Porto Mantovano (IT); Gabriele Mei, Ferrara (IT)

(73) Assignee: Basell Poliolefine Italia s.r.l., Milan (IT)

( * ) Notice: Subject to any disclaimer, the term of this patent is extended or adjusted under 35 U.S.C. 154(b) by 0 days.

(21) Appl. No.: 12/990,536

(22) PCT Filed: May 15, 2009

(86) PCT No.: PCT/EP2009/055916
§ 371 (c)(1),
(2), (4) Date: Nov. 1, 2010

(87) PCT Pub. No.: WO2009/144144
PCT Pub. Date: Dec. 3, 2009

(65) Prior Publication Data
US 2011/0054127 A1    Mar. 3, 2011

Related U.S. Application Data

(60) Provisional application No. 61/130,478, filed on May 30, 2008.

(30) Foreign Application Priority Data

May 27, 2008 (EP) .................................... 08156941

(51) Int. Cl.
*C08F 2/34* (2006.01)
*C08L 23/20* (2006.01)

(52) U.S. Cl. .............. 526/65; 526/64; 526/67; 526/901; 525/52

(58) Field of Classification Search ................ 526/64, 526/65, 67, 901; 525/52
See application file for complete search history.

(56) References Cited

U.S. PATENT DOCUMENTS

| 4,543,399 | A | 9/1985 | Jenkins, III et al. |
| 5,541,270 | A | 7/1996 | Chinh et al. |
| 5,668,228 | A * | 9/1997 | Chinh et al. ............. 526/67 |
| 6,689,845 | B1 * | 2/2004 | Govoni et al. ............. 526/65 |
| 7,482,411 | B2 | 1/2009 | Penzo et al. |
| 2002/0061264 | A1 | 5/2002 | Govoni et al. |
| 2004/0072971 | A1 | 4/2004 | Govoni et al. |
| 2004/0235645 | A1 | 11/2004 | Morini et al. |

OTHER PUBLICATIONS

Geldart, D., *Gas Fluidization Technology*, pp. 155 et seq., John Wiley & Sons Ltd., 1986.

* cited by examiner

*Primary Examiner* — Fred M Teskin
(74) *Attorney, Agent, or Firm* — Dilworth IP LLC

(57) ABSTRACT

A process for the polymerization of olefins carried out in a gas-phase reactor having interconnected polymerization zones, where the growing polymer particles flow upward through a first polymerization zone (riser) under fast fluidization or transport conditions, leave said riser and enter a second polymerization zone (downcomer) through which they flow downward under the action of gravity, leave said downcomer and are reintroduced into the riser, a gas recycle stream being withdrawn from said first polymerization zone, subjected to cooling below its dew point and then returned to said first polymerization zone, the process being characterized in that said gas recycle stream is cooled at a temperature Tc ranging from 0.05° C. to 3° C. below its dew point.

9 Claims, 2 Drawing Sheets

PROCESS FOR THE GAS-PHASE POLYMERIZATION OF OLEFINS

This application is the U.S. national phase of International Application PCT/EP2009/055916, filed May 15, 2009, claiming priority to European Application 08156941.0 filed May 27, 2008 and the benefit under 35 U.S.C. 119(e) of U.S. Provisional Application No. 61/130,478, filed May 30, 2008; the disclosures of International Application PCT/EP2009/055916, European Application 08156941.0 and U.S. Provisional Application No. 61/130,478, each as filed, are incorporated herein by reference.

BACKGROUND OF THE INVENTION

The present invention relates to a process for the gas-phase polymerization of olefins using a reactor having interconnected polymerisation zones. In particular, the invention relates to a gas-phase polymerisation carried out in a reactor having interconnected polymerisation zones, where the first polymerization zone is operated in a "condensed mode".

The development of catalysts with high activity and selectivity of the Ziegler-Natta type and, more recently, of the metallocene type has led to the widespread use on an industrial scale of processes in which the olefin polymerization is carried out in a gaseous medium in the presence of a solid catalyst. The polymerization of olefins is an exothermic reaction and it is therefore necessary to provide means to cool the bed to remove the heat of polymerization. In the absence of such cooling the bed would increase in temperature until, for example, the catalyst turns inactive or the polymer particles are partially fused. In a fluidized bed polymerization, the preferred method for removing the heat of polymerization is by feeding to the polymerization reactor a recycle gas stream at a temperature lower than the desired polymerization temperature. Such a gas stream, by passing through the fluidized bed, allows conducting away the heat of polymerization. The recycle gas stream is withdrawn from the upper zone of the reactor, cooled by passage through an external heat exchanger and then recycled to the reactor. The temperature of the recycle gas can be adjusted in the heat exchanger to maintain the fluidized bed at the desired polymerization temperature.

EP 089691 relates to a process for increasing the space time yield in a continuous gas fluidized bed process for the polymerization of olefins. According to this patent, the recycle gas stream is intentionally cooled to a temperature below the dew point of the recycle gas stream to produce a two-phase gas/liquid mixture under conditions such that the liquid phase of said mixture will remain entrained in the gas phase of said mixture. The heat of polymerization is removed by introducing said two-phase mixture into the reactor at a point in the lower region of the reactor, and most preferably at the bottom of the reactor to ensure uniformity of the fluid stream passing upwardly through the fluidized bed. The evaporation of the liquid phase takes place inside the polymerization bed and this ensures a more effective removal of the heat of polymerization. This technique is referred to as operation in the "condensing mode". By operating in the "condensing mode", the cooling capacity of the recycle stream is increased by both the vaporization of the condensed liquids entrained in the recycle stream and as a result of the greater temperature gradient between the entering recycle stream and the reactor.

EP 699 213 relates to a continuous fluidized bed process for the polymerization of olefins operating in the condensing mode. According to this patent, after the cooling of the recycle stream at a temperature below its dew point, at least part of the condensed liquid is separated by the gas phase and introduced directly into the fluidized bed. In order to gain the maximum benefit in term of cooling of the fluidized bed, the separated liquid must be introduced in the region of the bed that has substantially reached the temperature of the gaseous stream leaving the reactor. The introduction of the separated liquid may be carried out at a plurality of points within this region of the fluidized bed, and these points may be at different heights within this region. Injection means are required, preferably nozzles, arranged such that they protrude substantially vertically into the fluidized bed or may be arranged such that they protrude from the walls of the reactor in a substantially horizontal direction.

A novel gas-phase polymerization process, which represents a gas-phase technology alternative to the fluidized bed reactor technology, as to the preparation of olefin polymers, is disclosed in EP-B-1012195. The polymerization process is carried out in a gas-phase reactor having interconnected polymerization zones, where the growing polymer particles flow through a first polymerization zone (riser) under fast fluidization or transport conditions, leave said riser and enter a second polymerization zone (downcomer) through which they flow in a densified form under the action of gravity, leave said downcomer and are reintroduced into the riser, thus establishing a circulation of polymer between the two polymerization zones.

This polymerization process allows to obtain polymers with a broad molecular weight distribution by establishing different polymerisation conditions in the two interconnected polymerisation zones. This is achieved by introducing into the upper part of the downcomer a gas/liquid mixture, which evaporates and forms a barrier stream preventing or limiting the gases present in the riser from entering the downcomer. Accordingly, different polymerisation conditions can be maintained in the riser and in the downcomer.

The specification of EP 1012195 only mentions that the gas recycle stream entering the riser may contain entrained droplets of liquid, as it is customary when operating in the so-called "condensing mode". However, this document totally fails to point out any criticality in the step of cooling the gas recycle stream below its dew point. Furthermore, all the polymerization runs in the working examples of this patent are performed avoiding any condensation of the gas recycle stream, which continuously flows upwards along the riser and ensures the transport of the polymer particles in this polymerization zone.

Moreover, a high-power compressor must be always arranged on the recycle line to recycle the gas stream with a pressure and velocity suitable to ensure fast fluidization conditions in the riser: this high-power compressor causes a high energy consumption and increases the operating costs of the polymerization plant.

In view of the above, it would be desirable to decrease the power consumption required by the compressor of the recycle line, while improving the heat removal inside the first polymerization zone (riser).

BRIEF SUMMARY OF THE INVENTION

The Applicant has now found specific operative conditions, which allow to achieve the double advantage of improving the heat removal in the riser and simultaneously decreasing the power consumption required by the recycle compressor.

It is therefore an object of the present invention a process for the polymerisation of olefins carried out in a gas-phase reactor having interconnected polymerization zones, where the growing polymer particles flow upward through a first polymerization zone (riser) under fast fluidization conditions, leave said riser and enter a second polymerization zone (downcomer) through which they flow downward under the action of gravity, leave said downcomer and are reintroduced into the riser, a gas recycle stream being withdrawn from said first polymerisation zone, subjected to cooling below its dew point and then returned to said first polymerisation zone, the process being characterised in that said gas recycle stream is cooled at a temperature Tc ranging from 0.05° C. to 3° C. below its dew point.

In the present description the temperature Tc is referred as the temperature at which the gas recycle stream is cooled before its reintroduction into the riser: according to the operative conditions of the invention the temperature Tc is set below the dew point of a ΔT comprised between 0.05° C. and 3° C.

The process of present is addressed to improve the operability of a gas-phase reactor having interconnected polymerization zones of the type described in EP 782 587 and EP 1012195.

Throughout the present description the first polymerisation zone, which comprises polymer particles flowing upwards under fast fluidisation conditions, is generally referred to as the "riser". The second polymerisation zone, which comprises polymer particles flowing downwards by gravity, is generally referred to as the "downcomer".

DETAILED DESCRIPTION OF THE INVENTION

Figure 1:
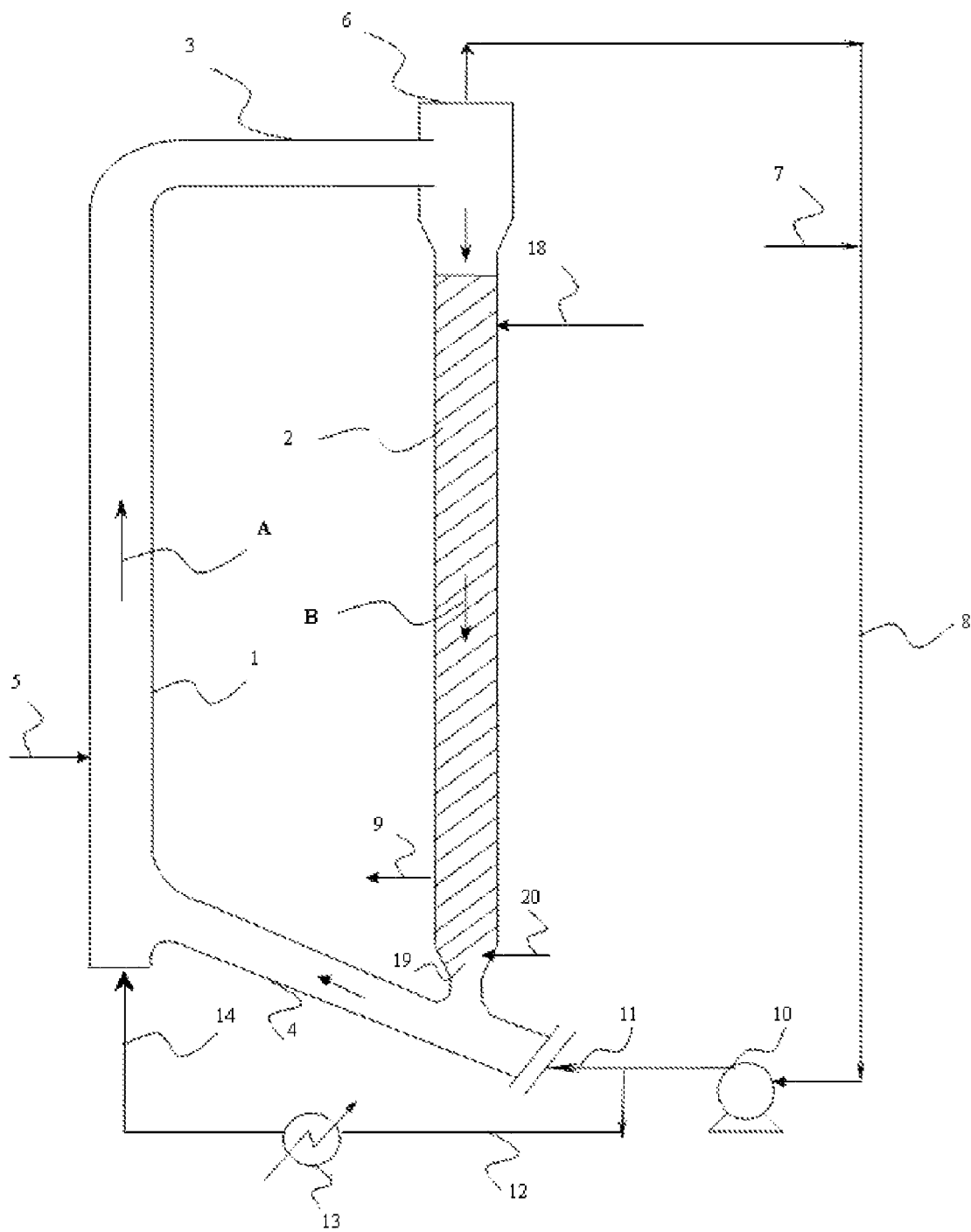
FIG. 1 is a diagrammatic representation of a gas-phase polymerization process having two interconnected polymerization zones, where recycle gas is split, and one of the split streams is conveyed to cooling device 13 via line 12 where it is cooled to a temperature below its dew point, and the resultant gas/liquid stream is fed to the bottom of the riser 1 via line 14.

In the first polymerization zone (riser), fast fluidization conditions are established by feeding a gas mixture comprising one or more alpha-olefins at a velocity higher than the transport velocity of the polymer particles. The velocity of said gas mixture is generally comprised between 0.5 and 15 m/s, preferably between 0.8 and 5 m/s. The terms "transport velocity" and "fast fluidization conditions" are well known in the art; for a definition thereof, see, for example, "D. Geldart, Gas Fluidisation Technology, page 155 et seq., J. Wiley & Sons Ltd., 1986".

In the second polymerization zone (downcomer), the polymer particles flow under the action of gravity in a densified form, so that high values of density of the solid (mass of polymer per volume of reactor) are achieved, said density of solid approaching the bulk density of the polymer. A "densified form" of the polymer implies that the ratio between the mass of polymer particles and the reactor volume is higher than 80% of the "poured bulk density" of the obtained polymer. Thus, for instance, in case of a polymer bulk density equal to 420 Kg/m$^3$, "densified conditions" of the polymer flow are satisfied if the polymer mass/reactor volume ratio is higher than 336 kg/m$^3$. The "poured bulk density" of a polymer is a parameter well known to the person skilled in the art: it can be measured according to ASTM D1895/69. In view of the above explanation, it is clear that in the downcomer the polymer flows downward in a plug flow and only small quantities of gas are entrained with the polymer particles.

The operative conditions of temperature and pressure are those usually used in gas-phase catalytic polymerization processes. Therefore, in both riser and downcomer the temperature is generally comprised between 60° C. and 120° C., while the pressure can ranges from 5 to 50 bar.

The polymerization process of the present invention is based on the selection of specific operative conditions, which allow to operate the riser in a "condensed mode" without the risk to compromise the regular conditions of fast fluidization in said polymerization zone. According to the invention a portion of the gas recycle stream is subjected to condensation, so that a two-phase gas/liquid mixture is returned back to the first polymerization zone of the gas-phase reactor. Typically, the two-phase gas/liquid mixture entering the riser comprises from 0.1 to 20% by weight of liquid, preferably from 3 to 15% wt.

It has been found that the limitation of Tc to a value of not more than 3° C. below the dew point of the recycle stream does not interfere with the fast fluidisation regime established in the riser. The comparative example of present patent application demonstrates that when the temperature gradient between the above defined Tc and the dew point is higher than 3° C., the reactor become inoperable, because the flow rate of gas introduced at the bottom of the riser is decreased to such a level that the amount of condensed liquid becomes undispersed in the gas-phase, with the severe drawback of solid agglomeration and formation of polymer chunks.

It has been further found that the best conditions to operate the riser in the "condensed mode" occur when the above defined temperature Tc ranges from 0.5° C. to 2° C. below the dew point of the recycle stream.

Many advantages can be accomplished by carrying out the process of the invention. In the first place, the introduction of a partially condensed stream into the riser according to the operative conditions of the invention improves the removal of the heat of polymerization from said polymerization zone, without causing any interference with the regime of fast fluidization conditions existing in the riser: the evaporation of the condensed liquid gives a relevant contribution to cool the polymer particles in the bottom portion of the riser.

Moreover, the lower is the above defined temperature Tc, the higher is the percentage of liquid components introduced into the riser, so that the reactor becomes operable with a minor amount of gas stream continuously recycled along the recycle line. As a consequence, the lower is the above temperature Tc, the lower is the power consumption required by the recycle compressor: the compression stage becomes less burdensome and the size of the recycle compressor may be considerably decreased.

A further advantage correlated with the decrease of gas stream continuously recycled to the riser is that said first polymerization zone may be designed with a decreased size, i.e. the riser diameter may be decreased, or alternatively, the riser height may be decreased with respect to the case of operation in the "non-condensing mode".

According a first embodiment of the invention, the liquid obtained by partial condensation of the recycle gas stream can be introduced at the bottom of the riser together with the gas supporting the fast fluidisation conditions in the riser.

According to a second and alternative embodiment of the invention, the liquid obtained by partial condensation of the recycle gas stream is separated from the gas and hence is introduced separately in the riser at one or more different points.

The process of the present invention will now be described in detail with reference to the enclosed FIGS. 1-2, which have to be considered illustrative and not limitative of the scope of the invention.

FIG. 1 is a diagrammatic representation of a gas-phase polymerization apparatus having two interconnected polymerization zones, as described in EP-B-782587 and EP-B-1012 195. The polymerization reactor comprises a first polymerization zone 1 (riser), wherein the polymer particles flow upward under fast fluidization conditions along the direction of the arrow A and a second polymerization zone 2 (downcomer), wherein the polymer particles flow downward under the action of gravity along the direction of the arrow B. The two polymerization zones 1 and 2 are appropriately interconnected by the sections 3 and 4. The catalyst components, preferably after a prepolymerization step, are continuously introduced via line 5 into the riser 1.

The velocity of the transport gas injected into the riser 1 has to be higher than the transport velocity under the operating conditions, and depends on the gas density and the particle size distribution of the solid. It is preferably comprised between 0.5 and 15 m/s, more preferably between 0.8 and 5 m/s.

The growing polymer particles and the gaseous mixture leave the riser 1 and are conveyed to a solid/gas separation zone 6, where the polymer particles are separated from most of the gas phase. The separated polymer enters the downcomer 2, while a gaseous mixture flows upward to the top of said separation zone 6 and successively enters the gas recycle line 8.

The polymer can be discharged through a line 9 advantageously placed in the downcomer 2, where the polymer particles flow in a more packed form, so to minimise the quantity of entrained gas. By inserting a controlled valve at a suitable point upstream of the exit region of the polymer from the downcomer, it becomes possible to continuously control the withdrawal of the polymer produced.

The amount of polymer circulating between the two polymerisation zones is controlled by metering the amount of polymer leaving the downcomer 2. This can be done by using means suitable for controlling the flow of solids such as, for example, mechanical valves (slide valve, butterfly valve, V-ball valve, etc.) or non-mechanical valves (L valve, J valve, reverse seal, etc.). The interconnection section 4 can be horizontal or inclined and a grid can be provided placed substantially longitudinally in the section 4 to separate the bottom part of said section 4 from the upper part where the solid flows.

The gaseous mixture leaving the separation zone 6 is transferred via the recycle line 8 to the compression means 10 before its reintroduction into the riser 1. A gaseous mixture comprising one or more olefins, hydrogen and an alkane, preferably propane, as a polymerization diluent, is fed to the polymerization reactor via one or more lines 7, suitable placed at any point of the gas recycle line 8, according to the knowledge of a person skilled in art.

The gas recycle stream is compressed by means of the compressor 10 and then split in two gaseous streams 11 and 12. A minor part of the recycle gas is introduced via line 11 into the interconnection section 4. The purpose of introducing a part of the gaseous mixture through line 11 is also to control the flow of polymer coming from the downcomer and to transport it through section 4 into the riser.

Most of the recycle gas is conveyed via line 12 to a cooling device 13, such as a condenser, where it is cooled at a temperature below its dew point at the conditions of present invention, and the obtained gas/liquid mixture is directly fed to the bottom of the riser 1 via line 14.

The gas phase of the above two-phase mixture has the function to ensure fast fluidization conditions to the polymer bed present in the riser 1, while the liquid components introduced into the riser contribute significantly to improve the heat removal in the bottom portion of the riser 1. When the recycle stream contains for example heavy monomers such as 1-butene, 1-hexene or 1-octene, or heavy inert gases, such as pentane, n-hexane, the dew point of the gas recycle stream increases and condensation occurs at higher temperature, all the other conditions being the same. Therefore, the amount of liquid formed in the condenser 13 and the ratio of gas to liquid fed to the riser 1 via line 14 can be precisely controlled.

According to a second embodiment of the invention, shown in FIG. 2, most of the recycle gas is conveyed via line 12 to a cooling device 13, such as a condenser, where it is cooled at a temperature below its dew point at the conditions of present invention. The obtained gas/liquid mixture is successively conveyed to a gas/liquid separator 15, so that the gaseous components are separated from the liquid components. As a consequence, the gas phase is released away from the top of the separator 15 and is introduced via line 14 to the bottom of the riser 1, so as to establish fast fluidisation conditions in the riser 1. On the other hand, a liquid stream is collected from the bottom of the separator 15 and is fed via line 16 to the central portion of the riser 1. One or more feeding points 17 may be arranged along the riser 1 in order to fed said liquid stream.

In view of this alternative embodiment, the evaporation of the liquid components is achieved at different heights along the riser, so that the improvement in the heat removal is more homogeneously distributed along the height of the riser.

According to another aspect, the gas mixture coming from the riser 1 is prevented from entering the downcomer 2 by introducing a gas and/or liquid mixture of different composition through one or more introduction lines placed into the downcomer 2, preferably at a point close to the upper limit of the volume occupied by the densified solid.

The gas and/or liquid mixture of different composition to be fed into the downcomer can optionally be fed in partially or totally liquefied form. The liquefied gas mixture can also be sprinkled over the upper surface of the bed of densified polymer particles; the evaporation of the liquid in the polymerisation zone will provide the required gas flow.

Figure 2:
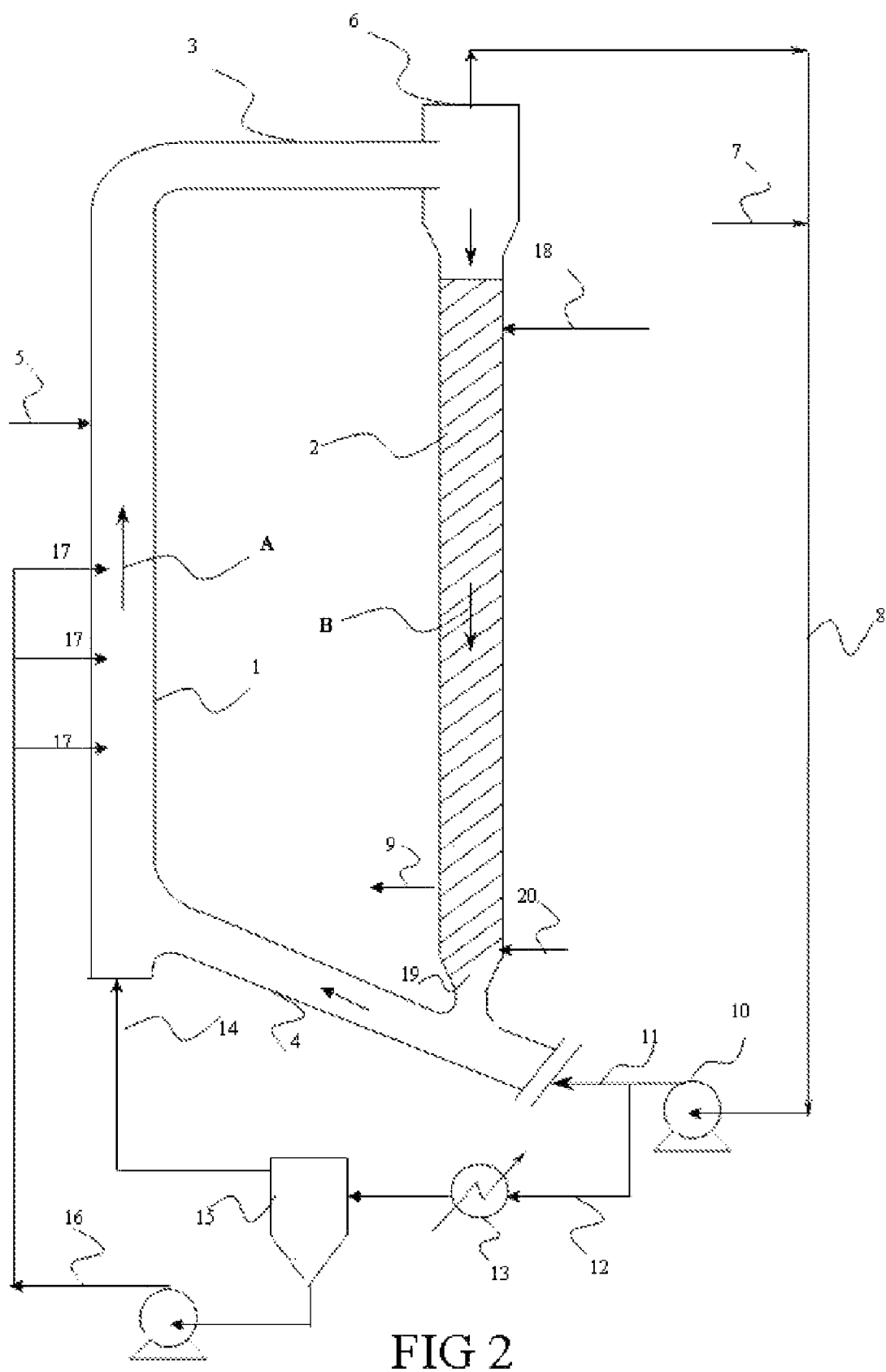
FIG. 2 is a diagrammatic representation of a gas-phase polymerization process having two interconnected polymerization zones, where recycle gas is split, and one of the split streams is conveyed to cooling device 13 via line 12 where it is cooled to a temperature below its dew point. The resultant gas/liquid stream is conveyed to a gas/liquid separator 15, where the separated gas phase is routed from the top of separator 15 to the bottom of the riser 1 via line 14, and the separated liquid phase is routed from the bottom of separator 15 via line 16 to the central portion of riser 1 at feeding points 17.

With reference to either FIG. 1 or 2, the above technical effect can be achieved by feeding a gas and/or liquid into the downcomer 2 through a line 18 placed at a suitable point of said downcomer 2, preferably in the upper part thereof. The gas and/or liquid mixture has a composition different from that of the gas mixture present in the riser 1. Said gas and/or liquid mixture partially or totally replaces the gas mixture entrained with the polymer particles entering the downcomer. The flow rate of this gas and/or liquid feed can be regulated so that a flow of gas counter-current to the flow of polymer particles is originated in the downcomer 2, particularly at the top thereof, thus acting as a barrier to the gas mixture coming from the riser 1, which is entrained among the polymer particles.

It is also possible to place several feed lines 18 in the downcomer 2 at different heights, in order to better control the gas-phase composition throughout said downcomer. These additional feed lines 18 can be used to introduce condensed monomers or inert components. Their evaporation in the downcomer 2 contributes to remove the heat of the polymerisation reaction, thus allowing to control the temperature profile in the downcomer 2 in a reliable way.

In order to control the solids recirculation between the two polymerization zones, and to provide greater resistance to backward gas flow in the section where the downcomer 2 leads into the connecting section 5, the section of the bottom of the downcomer 2 can conveniently converge into a restriction 19. Advantageously, adjustable mechanical valves can be employed, such as, for example, a throttle valve, such as a butterfly valve.

A stream of a gas, also denominated as the "dosing gas", may be fed into the lower part of the downcomer 2 by means of a line 20 placed above a suitable distance from the restriction 19. The dosing gas to be introduced through line 20 is conveniently taken from the recycle line 8, more precisely, downstream the compressor 10 and upstream the heat exchanger 13. The main function of said dosing gas is to control the solid recirculation flow from the downcomer 2 to the riser 1 through the restriction 19.

The polymerization process of the invention allows the preparation of a large number of polyolefin blends with a large flexibility as regards the mutual ratio of the (co)polymer components contained in the blend.

Examples of bimodal polyolefins that can be obtained are: bimodal polyethylene blends comprising a low molecular weight fraction and a high molecular weight fraction; bimodal polypropylene blends comprising a low molecular weight fraction and a high molecular weight fraction; polypropylene blends containing a propylene homopolymer and a random copolymer deriving from copolymerization of propylene with small amounts, up to 15% by wt, of comonomers selected from ethylene, 1-butene and 1-hexene;

The above mentioned bimodal polyethylene blends are particularly suitable to be subjected to injection molding for preparing shaped articles. The above mentioned polypropylene blends may be used to prepare films and fibers.

The polymerization process of the present invention can be carried out upstream or downstream other conventional polymerization technologies (either in a liquid-phase or a gas-phase) to give rise a sequential multistage polymerization process. For instance, a fluidised bed reactor can be used to prepare a first polymer component, which is successively fed to the gas-phase reactor of FIG. 1 to prepare a second and a third polymer component. Accordingly, an ethylene polymer endowed with a tri-modal molecular weight distribution can be obtained, as well as a polypropylene blend comprising three components having a different content in ethylene.

The gas-phase polymerization process herewith described is not restricted to the use of any particular family of polymerization catalysts. The invention is useful in any exothermic polymerization reaction employing any catalyst, whether it is supported or unsupported, and regardless of whether it is in pre-polymerized form.

The polymerization reaction can be carried out in the presence of highly active catalytic systems, such as Ziegler-Natta catalysts, single site catalysts, chromium-based catalysts, vanadium-based catalysts.

A Ziegler-Natta catalyst system comprises the catalysts obtained by the reaction of a transition metal compound of groups 4 to 10 of the Periodic Table of Elements (new notation) with an organometallic compound of group 1, 2, or 13 of the Periodic Table of element.

In particular, the transition metal compound can be selected among compounds of Ti, V, Zr, Cr, and Hf. Preferred compounds are those of formula $Ti(OR)_n X_{y-n}$, in which n is comprised between 0 and y; y is the valence of titanium; X is halogen and R is a hydrocarbon group having 1-10 carbon atoms or a COR group. Among them, particularly preferred are titanium compounds having at least one Ti-halogen bond such as titanium tetrahalides or halogenalcoholates. Preferred specific titanium compounds are $TiCl_3$, $TiCl_4$, $Ti(OBu)_4$, $Ti(OBu)Cl_3$, $Ti(OBu)_2Cl_2$, $Ti(OBu)_3C_1$.

Preferred organometallic compounds are the organo-Al compounds and in particular Al-alkyl compounds. The alkyl-Al compound is preferably chosen among the trialkyl aluminum compounds such as for example triethylaluminum, tri-isobutylaluminum, tri-n-butylaluminum, tri-n-hexylaluminum, tri-n-octylaluminum. It is also possible to use alkylaluminum halides, alkylaluminum hydrides or alkylaluminum sesquichlorides such as $AlEt_2Cl$ and $Al_2Et_3Cl_3$ optionally in mixture with said trialkyl aluminum compounds.

Particularly suitable high yield ZN catalysts are those wherein the titanium compound is supported on magnesium halide in active form which is preferably $MgCl_2$ in active form. Particularly for the preparation crystalline polymers of $CH_2CHR$ olefins, where R is a C1 C10 hydrocarbon group, internal electron donor compounds can be supported on the $MgCl_2$. Typically, they can be selected among esters, ethers, amines, and ketones. In particular, the use of compounds belonging to 1,3-diethers, cyclic ethers, phthalates, benzoates, acetates and succinates is preferred.

When it is desired to obtain a highly isotactic crystalline polypropylene, it is advisable to use, besides the electron-donor present in the solid catalytic component, an external electron-donor (ED) added to the aluminium alkyl co-catalyst component or to the polymerization reactor. These external electron donors can be selected among alcohols, glycols, esters, ketones, amines, amides, nitriles, alkoxysilanes and ethers. The electron donor compounds (ED) can be used alone or in mixture with each other. Preferably the ED compound is selected among aliphatic ethers, esters and alkoxysilanes. Preferred ethers are the C2-C20 aliphatic ethers and in particular the cyclic ethers preferably having 3-5 carbon atoms, such as tetrahydrofurane (THF), dioxane. Preferred esters are the alkyl esters of C1-C20 aliphatic carboxylic acids and in particular C1-C8 alkyl esters of aliphatic mono carboxylic acids such as ethylacetate, methyl formiate, ethylformiate, methylacetate, propylacetate, i-propylacetate, n-butylacetate, i-butylacetate.

The preferred alkoxysilanes are of formula $R_a^1 R_b^2 Si(OR^3)_c$, where a and b are integer from 0 to 2, c is an integer from 1 to 3 and the sum (a+b+c) is 4; $R^1$, $R^2$, and $R^3$, are alkyl, cycloalkyl or aryl radicals with 1-18 carbon atoms. Particularly preferred are the silicon compounds in which a is 1, b is 1, c is 2, at least one of $R^1$ and $R^2$ is selected from branched alkyl, cycloalkyl or aryl groups with 3-10 carbon atoms and $R^3$ is a $C_1$-$C_{10}$ alkyl group, in particular methyl.

Other useful catalysts are the vanadium-based catalysts, which comprise the reaction product of a vanadium compound with an aluminum compound, optionally in the presence of a halogenated organic compound. Optionally the vanadium compound can be supported on an inorganic carrier, such as silica, alumina, magnesium chloride. Suitable vanadium compounds are $VCl_4$, $VCl_3$, $VOCl_3$, vanadium acetyl acetonate.

Other useful catalysts are those based on chromium compounds, such as chromium oxide on silica, also known as Phillips catalysts.

Other useful catalysts are single site catalysts, for instance metallocene-based catalyst systems which comprise:
at least a transition metal compound containing at least one p bond;
at least an alumoxane or a compound able to form an alkyl-metallocene cation; and
optionally an organo-aluminum compound.

A preferred class of metal compounds containing at least one Π bond are metallocene compounds belonging to the following formula (I):

$$Cp(L)_qAMX_p \quad (I)$$

wherein M is a transition metal belonging to group 4, 5 or to the lanthanide or actinide groups of the Periodic Table of the Elements; preferably M is zirconium, titanium or hafnium; the substituents X, equal to or different from each other, are monoanionic sigma ligands selected from the group consisting of hydrogen, halogen, $R^6$, $OR^6$, $OCOR^6$, $SR^6$, $NR^6_2$ and $PR^6_2$, wherein $R^6$ is a hydrocarbon radical containing from 1 to 40 carbon atoms; preferably, the substituents X are selected from the group consisting of —Cl, —Br, -Me, -Et, -n-Bu, -sec-Bu, -Ph, -Bz, —CH$_2$SiMe$_3$, —OEt, —OPr, —OBu, —OBz and —NMe$_2$;
p is an integer equal to the oxidation state of the metal M minus 2;
n is 0 or 1; when n is 0 the bridge L is not present;
L is a divalent hydrocarbon moiety containing from 1 to 40 carbon atoms, optionally containing up to 5 silicon atoms, bridging Cp and A, preferably L is a divalent group $(ZR^7_2)_n$; Z being C, Si, and the $R^7$ groups, equal to or different from each other, being hydrogen or a hydrocarbon radical containing from 1 to 40 carbon atoms;
more preferably L is selected from Si(CH$_3$)$_2$, SiPh$_2$, SiPhMe, SiMe(SiMe$_3$), CH$_2$, (CH$_2$)$_2$, (CH$_2$)$_3$ or C(CH$_3$)$_2$;
Cp is a substituted or unsubstituted cyclopentadienyl group, optionally condensed to one or more substituted or unsubstituted, saturated, unsaturated or aromatic rings;
A has the same meaning of Cp or it is a $NR^7$, —O, S, moiety wherein $R^7$ is a hydrocarbon radical containing from 1 to 40 carbon atoms;
Alumoxanes used as component b) are considered to be linear, branched or cyclic compounds containing at least one group of the type:

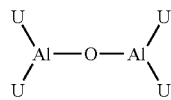

wherein the substituents U, same or different, are defined above.

In particular, alumoxanes of the formula:

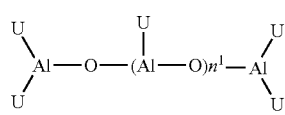

can be used in the case of linear compounds, wherein $n^1$ is 0 or an integer of from 1 to 40 and where the U substituents, same or different, are hydrogen atoms, halogen atoms, $C_1$-$C_{20}$-alkyl, $C_3$-$C_{20}$-cyclalkyl, $C_6$-$C_{20}$-aryl, $C_7$-$C_{20}$-alkylaryl or $C_7$-$C_{20}$-arylalkyl radicals, optionally containing silicon or germanium atoms, with the proviso that at least one U is different from halogen, and j ranges from 0 to 1, being also a non-integer number; or alumoxanes of the formula:

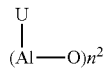

can be used in the case of cyclic compounds, wherein $n^2$ is an integer from 2 to 40 and the U substituents are defined as above.

The catalyst may suitably be employed in the form of a pre-polymer powder prepared beforehand during a pre-polymerization stage with the aid of a catalyst as described above. The pre-polymerization may be carried out by any suitable process, for example, polymerization in a liquid hydrocarbon diluent or in the gas phase using a batch process, a semi-continuous process or a continuous process.

In order to provide a better understanding of the invention the following examples are reported, which are given for illustrative purposes only and shall not be construed as limitative of the invention.

EXAMPLES

Propylene is polymerized in a plant comprising a gas-phase polymerisation apparatus of the kind shown in FIG. 1. Both riser and downcomer have a nominal diameter DN 100.

The catalyst employed comprised a catalyst component prepared with the procedure described in EP-A-728769, example 1, and triethylaluminium (TEAL) in a molar ratio TEAL/Ti of 280. Propylene is polymerized in the presence of propane as a polymerization diluent, and hydrogen as a molecular weight regulator. Both in the riser and in the downcomer a temperature of 80° C. and a pressure of 30 bar is adjusted.

The gas recycle stream is continuously withdrawn from the polymerization reactor and subjected to compression in compressor 10 and cooled in the condenser 13 according to the scheme shown in FIG. 1. After cooling, the recycle stream is reintroduced in the riser via line 14.

The molar composition of the recycle stream is the following: 75% mol propylene, 10% mol propane and 15% mol hydrogen. The dew point of said recycle stream is 58.8° C.

Table 1 indicates the temperature Tc to which the recycle stream is cooled in the condenser, the flow rate of the gas recycle stream and the weight percentage of liquid-phase formed downstream the cooling step.

It can be seen from Table 1 that the increase of the liquid amount in the two-phase mixture exiting the condenser makes the reactor operable with a minor amount of gas stream continuously recycled along the recycle line.

TABLE 1

| | Dew Point (° C.) | Tc (° C.) | Recycle stream (Kg/h) | Liquid % wt | Energy Save (%) |
|---|---|---|---|---|---|
| Example 1 (comp.) | 58.8 | 59.3 | 3300 | 0 | 0 |
| Example 2 | 58.8 | 58.0 | 2300 | 6.8 | 30.3 |
| Example 3 | 58.8 | 57.0 | 1700 | 15 | 48.5 |
| Example 4 (comp.) | 58.8 | 55.3 | 1230 | 25.9 | (**) Riser inoperable |

Example 1 (Comparative)

The gas recycle stream is cooled maintaining its temperature Tc above the dew point of the gas mixture. In this case, no liquid phase is formed and the flow rate of gas continuously recycled to the reactor is 3300 kg/h.

Example 2

The gas recycle stream is cooled to a value of 58° C., i.e. 0.8° C. below its dew point.

In this case, 6.8% by weight of liquid phase is formed and the flow rate of gas continuously recycled to the reactor is 2300 kg/h.

As a consequence, the power consumption required by the recycle compressor decreases with respect to comparative Example 1. Said power consumption is directly proportional to the gas flow rate, so that the energy save results proportional to the relative decrease of gas flow rate, and is equal to [(3300−2300)/3300×100]=30.3%.

Example 3

The recycle stream is cooled to a temperature Tc of 1.8° C. below the value of its dew point.

In this case, 15.0% by weight of liquid phase is formed and the flow rate of gas continuously recycled to the reactor is 1700 kg/h. As a consequence, the power consumption required by the recycle compressor decreases with respect to the case of comparative Example 1. The energy save results proportional to the relative decrease of gas flow rate, and is equal to [(3300−1700)/3300×100]=48.5%.

The amount of gas recycle stream withdrawn from the reactor and subjected to pressurization may be reduced to only 1700 Kg/h. A recycle compressor of minor size may be used, thus adsorbing a minor amount of energy: in this example the energy save is remarkable, resulting of 48.5% respect to the case of operating without condensation (Comparative Example 1). The two-phase mixture recycled to the riser contains 1445 kg/h of gas and 255 kg/h of liquid: it has been observed that a gas flow rate of 1445 Kg/h results still sufficient to ensure fast fluidisation conditions in the riser.

Example 4 (Comparative)

The recycle stream is cooled to a temperature Tc of 3.5° C. below the value of its dew point.

In this case, 25.9% by weight of liquid phase is formed and the flow rate of gas continuously recycled to the reactor is 1250 kg/h.

In this case, even if the power consumption required by the recycle compressor is further decreased, the gas-phase reactor becomes inoperable due to the fact that the liquid-phase entering the riser becomes undispersed in the gas-phase, with consequent formation of polymer chunks at the bottom of the riser.

Comparative example 4 demonstrates that when the gas recycle stream is cooled to a temperature Tc of more 3° C. below its dew point the riser becomes not operable.

The invention claimed is:

1. A process for the polymerization of olefins comprising polymerizing monomers in a gas-phase reactor having interconnected polymerization zones, where the growing polymer particles flow upward through a first polymerization zone (riser) under fast fluidization or transport conditions, leave said riser and enter a second polymerization zone (downcomer) through which they flow downward under the action of gravity, leave said downcomer and are reintroduced into the riser, a gas recycle stream being withdrawn from said first polymerisation zone, subjected to cooling below its dew point, thereby partially condensing the gas recycle stream to form a liquid, and then returned to said first polymerisation zone, wherein the gas recycle stream is cooled at a temperature Tc ranging from 0.5° C. to 2° C. below its dew point, wherein the liquid obtained by partial condensation of said recycle stream is separated from the gas and then introduced at two or more different points into the riser, and the gas mixture coming from said riser is partially prevented from entering said downcomer by introducing a gas and/or liquid mixture of different composition through at least one introduction line placed into said downcomer.

2. The process according to claim 1, wherein a two-phase mixture comprising a gas and liquid is returned back to said first polymerization zone.

3. The process according to claim 2, wherein said two-phase mixture comprises from 0.1 to 20% by weight of the liquid.

4. The process according to claim 1 carried out upstream or downstream other conventional polymerization technologies, either in a liquid-phase or a gas-phase.

5. The process according to claim 1 carried out in the presence of catalytic systems selected from Ziegler-Natta catalysts, single site catalysts and chromium-based catalysts.

6. A process for the polymerization of olefins comprising polymerizing monomers in a gas-phase reactor having interconnected polymerization zones to form a bimodal polyolefin, where the growing polymer particles flow upward through a first polymerization zone (riser) under fast fluidization or transport conditions, leave said riser and enter a second polymerization zone (downcomer) through which they flow downward under the action of gravity, leave said downcomer and are reintroduced into the riser, a gas recycle stream being withdrawn from said first polymerisation zone, subjected to cooling below its dew point, thereby partially condensing the gas recycle stream to form a liquid, and then returned to said first polymerisation zone, wherein the gas recycle stream is cooled at a temperature Tc ranging from 0.5° C. to 2° C. below its dew point, wherein the liquid obtained by partial condensation of said recycle stream is separated from the gas and then introduced at two or more different points into the riser, and the gas mixture coming from said riser is partially prevented from entering said downcomer by introducing a gas and/or liquid mixture of different composition through at least one introduction line placed into said downcomer.

7. The process of claim 6 wherein the bimodal polyolefin is a bimodal polyethylene blend comprising a low molecular weight fraction and a high molecular weight fraction.

8. The process of claim 6 wherein the bimodal polyolefin is a bimodal polypropylene blend comprising a low molecular weight fraction and a high molecular weight fraction.

9. The process of claim 6 wherein the bimodal polyolefin is a polypropylene blend containing a propylene homopolymer and a random copolymer of propylene with up to 15% by weight of comonomers selected from ethylene, 1-butene or 1-hexene.

* * * * *